US012060241B2

(12) United States Patent
Tsuji et al.

(10) Patent No.: US 12,060,241 B2
(45) Date of Patent: Aug. 13, 2024

(54) SHEET CONVEYING DEVICE AND IMAGE FORMING APPARATUS

(71) Applicant: KYOCERA Document Solutions Inc., Osaka (JP)

(72) Inventors: Hirofumi Tsuji, Osaka (JP); Shikitaro Ogawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 190 days.

(21) Appl. No.: 17/968,925

(22) Filed: Oct. 19, 2022

(65) Prior Publication Data

US 2023/0128182 A1 Apr. 27, 2023

(30) Foreign Application Priority Data

Oct. 26, 2021 (JP) ................................ 2021-174900

(51) Int. Cl.
*B65H 29/60* (2006.01)
*G03G 15/00* (2006.01)

(52) U.S. Cl.
CPC ......... *B65H 29/60* (2013.01); *G03G 15/6573* (2013.01); *B65H 2401/111* (2013.01); *G03G 2215/00675* (2013.01)

(58) Field of Classification Search
CPC .......... B65H 2301/448; B65H 2404/63; B65H 2401/111; B65H 33/14; B65H 29/58; B65H 29/60; G03G 15/6573; G03G 2215/00675
USPC ................................ 271/184, 225, 302, 303
See application file for complete search history.

(56) References Cited

U.S. PATENT DOCUMENTS

| | | | | |
|---|---|---|---|---|
| 5,127,642 A * | 7/1992 | Takimoto | G03G 15/602 | 271/7 |
| 8,434,755 B2 * | 5/2013 | Imai | B65H 5/062 | 271/9.13 |
| 9,260,273 B2 * | 2/2016 | Mizuno | B65H 29/58 | |
| 9,586,777 B2 * | 3/2017 | Izumichi | B65H 29/58 | |
| 11,262,684 B2 * | 3/2022 | Ikegami | B65H 85/00 | |

FOREIGN PATENT DOCUMENTS

JP 2014-206607 A 10/2014

* cited by examiner

*Primary Examiner* — Leslie A Nicholson, III
(74) *Attorney, Agent, or Firm* — Stein IP, LLC

(57) ABSTRACT

A sheet conveying device includes a sheet conveying passage and a switching guide. The switching guide switches the sheet conveying passage between first and second sheet conveying passages. The switching guide includes a plurality of guide ribs and guide members. The plurality of guide ribs are disposed at intervals in the sheet width direction and extend in the sheet conveying direction. The guide members are fitted to specific guide ribs selected from the plurality of guide ribs. The plurality of guide ribs have first and second guide surfaces that guide the sheet. The guide members are formed of a material having higher slidability than the plurality of guide ribs, and have third guide surfaces that are disposed at positions protruding further to an inner side of the sheet conveying passage than the first or second guide surfaces.

6 Claims, 6 Drawing Sheets

SHEET CONVEYING DEVICE AND IMAGE FORMING APPARATUS

INCORPORATION BY REFERENCE

This application is based upon and claims the benefit of priority from the corresponding Japanese Patent Application No. 2021-174900 filed on Oct. 26, 2021, the entire contents of which are hereby incorporated by reference.

BACKGROUND

The present disclosure relates to a sheet conveying device and an image forming apparatus.

Image forming apparatuses employing electrophotography such as copiers and printers may have a branch portion at which the conveying direction of a sheet (recording medium) on which an image has been formed is switched. The branch portion is furnished with a switching guide that swings when the sheet conveying direction is switched.

SUMMARY

According to one aspect of the present disclosure, a sheet conveying device includes a sheet conveying passage and a switching guide. The sheet conveying device includes: a first sheet conveying passage through which a sheet on which an image has been formed is conveyed; and a second sheet conveying passage which branches from a branch portion in the first sheet conveying passage and through which the sheet is conveyed. The switching guide is disposed at the branch portion and is swingable about a rotation axis that extends in the sheet width direction perpendicular to the sheet conveying direction. The switching guide switches the sheet conveying passage between the first and second sheet conveying passages. The switching guide includes a supporting portion, a plurality of guide ribs, and guide members. The supporting portion extends in the sheet width direction. The plurality of guide ribs are disposed on the supporting portion at intervals in the sheet width direction and extends along the sheet conveying direction. The guide members are fitted to specific guide ribs selected from the plurality of guide ribs. The plurality of guide ribs have first guide surfaces that guide the sheet to the first sheet conveying passage and second guide surfaces that guide the sheet to the second sheet conveying passage. The guide members are formed of a material having higher slidability than the plurality of guide ribs, and have third guide surfaces that are disposed at positions protruding further to an inner side of the sheet conveying passage than the first or second guide surfaces.

DETAILED DESCRIPTION

Embodiments of the present disclosure will be described below with reference to the accompanying drawings. The present disclosure is, however, not limited to what is specifically described below.

Figure 1:
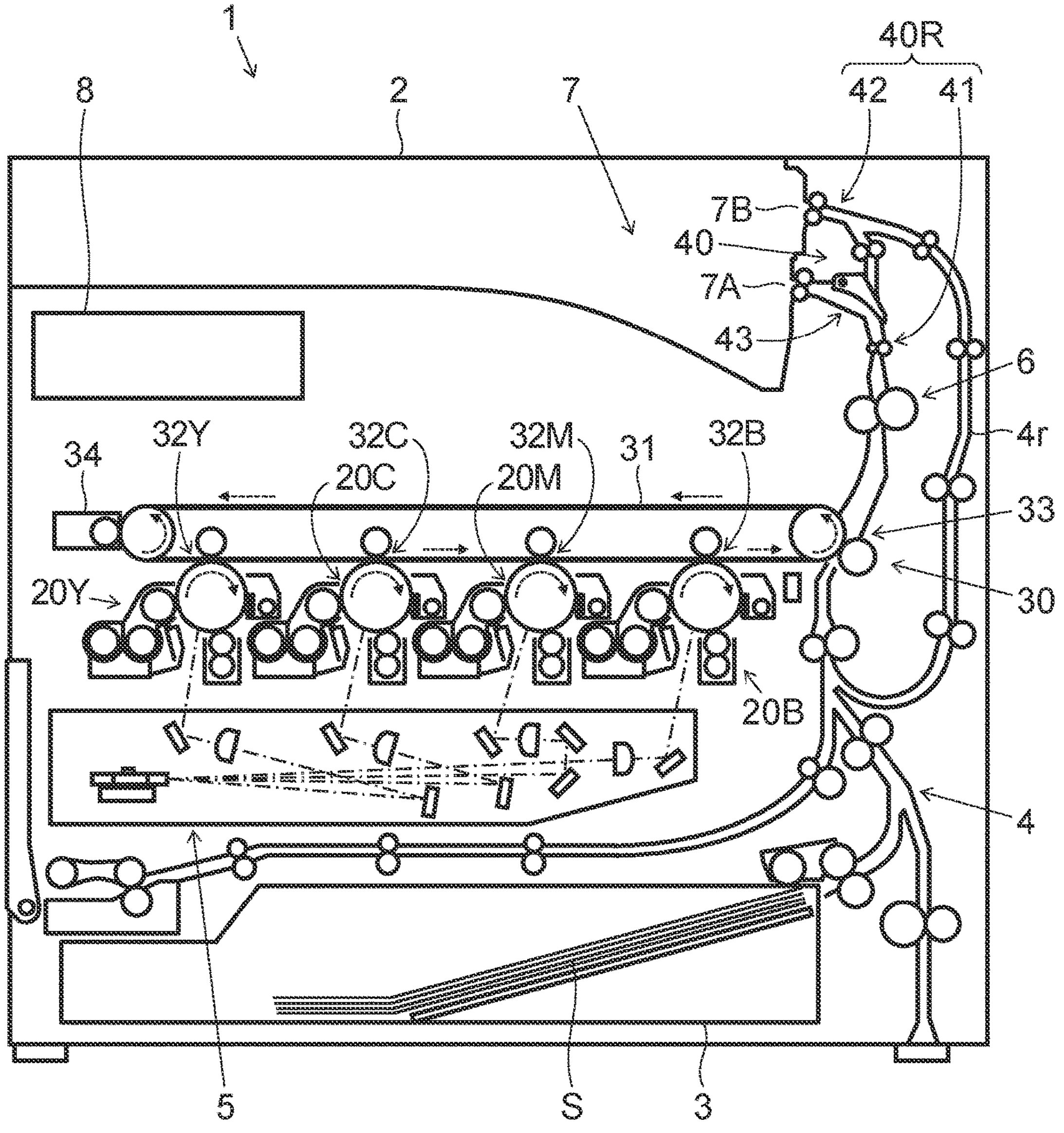
FIG. 1 is a schematic sectional front view of an image forming apparatus according to one embodiment of the present disclosure.

FIG. 1 is a schematic sectional front view of an image forming apparatus 1 according to an embodiment. One example of the image forming apparatus 1 according to the embodiment is a color printer of a tandem-type which transfers a toner image to a sheet (recording medium) S using an intermediate transfer belt 31. The image forming apparatus 1 may be what is called a multifunction peripheral provided with the functions of, for example, printing, scanning (image reading), and facsimile transmission.

As shown in FIG. 1, the image forming apparatus 1 includes, in its main body 2, a sheet feeding portion 3, a sheet conveying portion 4, an exposure portion 5, an image forming portion 20, a transfer portion 30, a fixing portion 6, a sheet discharge portion 7, and a control portion 8.

The sheet feeding portion 3 is disposed in a bottom part of the main body 2. The sheet feeding portion 3 stores a plurality of sheets S and, during printing, feeds them out one after another separately. The sheet conveying portion 4 conveys a sheet S fed out from the sheet feeding portion 3 to a secondary transfer portion 33 and then to the fixing portion 6. The sheet conveying portion 4 also has a reversing conveying passage **4*r* to which a sheet S is conveyed when duplex printing is performed. The exposure portion 5 shines laser light controlled based on image data toward the image forming portion 20**.

The image forming portion 20 is disposed under the intermediate transfer belt 31. The image forming portion 20 includes an image forming portion for yellow 20Y, an image forming portion for cyan 20C, an image forming portion for magenta 20M, and an image forming portion for black 20B. These four image forming portions 20 have basically similar structures. Thus, in the following description, the suffixes “Y”, “C”, “M”, and “B” distinguishing different colors are often omitted, unless distinction is needed.

The image forming portion 20 includes a photosensitive drum 21 which is supported so as to be rotatable in a predetermined direction (clockwise in FIG. 1). The image forming portion 20 further includes, disposed around the photosensitive drum 21 along its rotation direction, a charging portion, a developing portion, and a drum cleaning portion. A primary transfer portion 32 is disposed between the developing portion and the drum cleaning portion.

The photosensitive drum 21 has a photosensitive layer on its surface. The charging portion electrostatically charges the surface of the photosensitive drum 21 to a predetermined potential. The exposure portion 5 exposes to light the surface of the photosensitive drum 21 electrostatically charged by the charging portion to form an electrostatic latent image of the document image. The developing portion develops the electrostatic latent image by feeding it with toner to form a toner image. The four image forming portions 20 form toner images of different colors respectively. After the toner image is primarily transferred to the surface of the intermediate transfer belt 31, the drum cleaning portion performs cleaning by removing toner and the like left on the surface of the photosensitive drum 21. In this way, the image forming portion 20 forms an image (toner image) to be later transferred to a sheet S.

The transfer portion 30 includes an intermediate transfer belt 31, primary transfer portions 32Y, 32C, 32M, and 32B, a secondary transfer portion 33, and a belt cleaning portion 34. The intermediate transfer belt 31 is disposed over the four image forming portions 20. The intermediate transfer belt 31 is supported so as to be rotatable in a predetermined direction (counter-clockwise in FIG. 1). The intermediate transfer belt 31 is an intermediate transfer member to which toner images formed in the four image forming portions 20 are sequentially superposed on each other and are thereby primarily transferred. The four image forming portions 20 are disposed in what is called a tandem formation in which they are disposed in a row from upstream to downstream in the rotation direction of the intermediate transfer belt 31.

The primary transfer portions 32Y, 32C, 32M, and 32B are disposed across the intermediate transfer belt 31 over the image forming portions 20Y, 20C, 20M, and 20B for different colors. The secondary transfer portion 33 is disposed upstream of the fixing portion 6 in the sheet conveying direction in the sheet conveying portion 4, downstream of the image forming portions 20Y, 20C, 20M, and 20B for different colors in the rotation direction of the intermediate transfer belt 31 in the transfer portion 30. The belt cleaning portion 34 is disposed upstream of the image forming portions 20Y, 20C, 20M, and 20B for different colors in the rotation direction of the intermediate transfer belt 31.

The primary transfer portions 32 for different colors transfer the toner images formed on the surfaces of the photosensitive drums 21 to the intermediate transfer belt 31. Then, as the intermediate transfer belt 31 rotates, the toner images in the four image forming portions 20 are sequentially superposed on each other and are thereby transferred to the intermediate transfer belt 31 with predetermined timing. In this way, a color toner image with the toner images of four colors, namely yellow, cyan, magenta, and black, superposed together is formed on the surface of the intermediate transfer belt 31.

The color toner image on the surface of the intermediate transfer belt 31 is transferred to a sheet S conveyed in synchronism by the sheet conveying portion 4 at the secondary transfer nip formed in the secondary transfer portion 33. The belt cleaning portion 34, after secondary transfer, performs cleaning by removing toner and the like left on the surface of the intermediate transfer belt 31. In this way, the transfer portion 30 transfers toner images formed on the surfaces of the photosensitive drums 21 to a sheet S.

The fixing portion 6 is disposed above the secondary transfer portion 33. The fixing portion 6 heats and presses the sheet S having the toner image transferred to it to fix the toner image to the sheet S.

The sheet discharge portion 7 is disposed above the transfer portion 30. The sheet discharge portion 7 has a first sheet discharge port 7A and a second sheet discharge port 7B that are disposed in a side wall one above the other in the up-down direction. The sheet S having the toner image fixed to it and thus having undergone printing is conveyed to the sheet discharge portion 7 through the first sheet discharge port 7A. In the sheet discharge portion 7, the sheet having undergone printing (the print result) is picked up from above.

The control portion 8 includes a CPU, an image processing portion, a storage portion, and other electronic circuits and components (none of which are illustrated). The CPU, based on control programs and data stored in the storage portion, controls the operation of different components provided in the image forming apparatus 1 to perform processing related to the functions of the image forming apparatus 1. The sheet feeding portion 3, the sheet conveying portion 4, the exposure portion 5, the image forming portion 20, the transfer portion 30, and the fixing portion 6 individually receive commands from the control portion 8 and coordinate to perform printing on the sheet S. The storage portion is composed of a combination of, for example, a non-volatile storage device such as a program ROM (read-only memory) and a data ROM and a volatile storage device such as a RAM (random-access memory).

The image forming apparatus 1 further includes a sheet conveying device 40. The sheet conveying device 40 is disposed above the fixing portion 6, downstream of the fixing portion 6 in the sheet conveying direction. The sheet conveying device 40 transfers the sheet S after fixing on its first side to the sheet discharge portion 7 or to the reversing conveying passage 4*r*.

Figure 2:
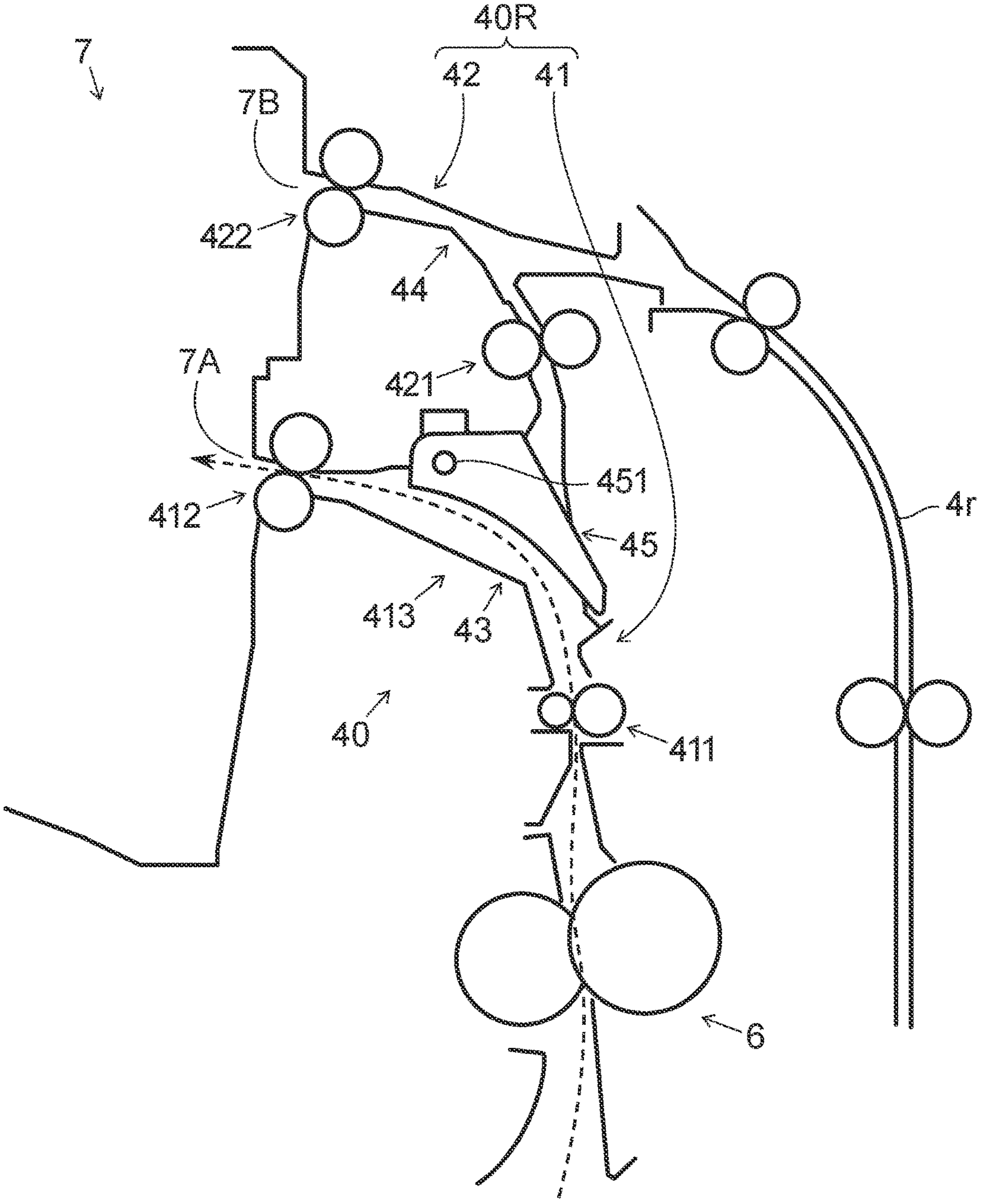
FIG. 2 is a schematic sectional front view of a sheet conveying device in the image forming apparatus in FIG. 1.
Figure 3:
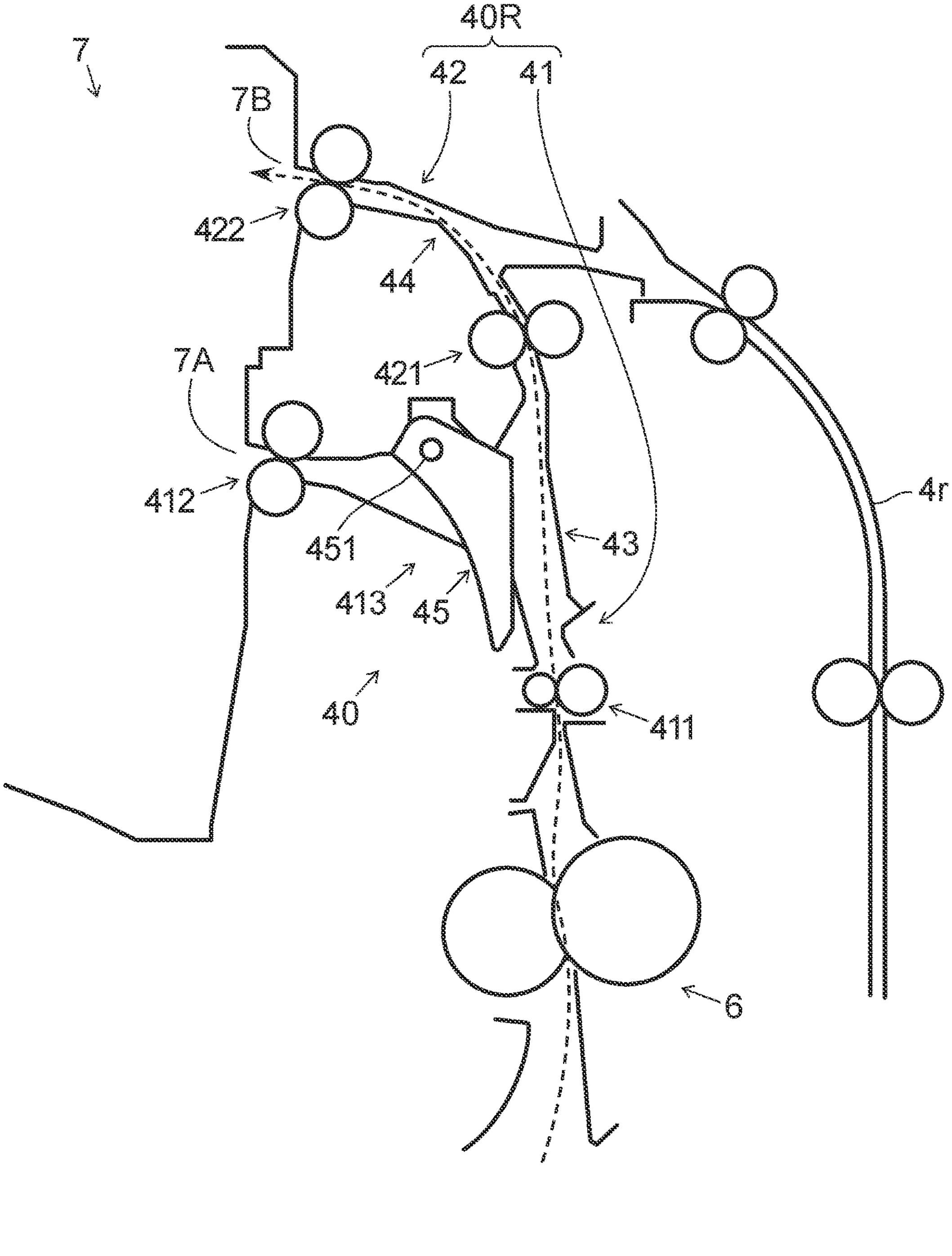
FIG. 3 is a schematic sectional front view of the sheet conveying device in FIG. 2, showing a state where a switching guide has been moved.

FIG. 2 is a schematic sectional front view of the sheet conveying device 40 in the image forming apparatus in FIG. 1. FIG. 3 is a schematic sectional front view of the sheet conveying device 40 in FIG. 2, showing a state where a switching guide 45 has been moved. The sheet conveying device 40 includes a sheet conveying passage 40R including a first sheet conveying passage 41 and a second sheet conveying passage 42, a branch portion 43, and a path switching portion 44.

The first sheet conveying passage 41 extends upward from the fixing portion 6 to the first sheet discharge port 7A. The broken line arrow in FIG. 2 indicates the path through which the sheet S that has passed through the fixing portion 6 moves toward the first sheet discharge port 7A. The first sheet conveying passage 41 includes a pair of conveying rollers 411 and a pair of first discharge rollers 412. The branch portion 43 is disposed in a middle part of the first sheet conveying passage 41, between the pair of conveying rollers 411 and the pair of first discharge rollers 412.

The pair of conveying rollers 411 is disposed in an upstream part of the first sheet conveying passage 41. The pair of conveying rollers 411 conveys the sheet S having passed through the fixing portion 6 toward the branch portion 43. The pair of first discharge rollers 412 is disposed downstream of the first sheet conveying passage 41. The pair of first discharge rollers 412 conveys the sheet S having passed the branch portion 43 toward the sheet discharge portion 7 through the first sheet discharge port 7A. In this way, the first sheet conveying passage 41 conveys the sheet S on which an image has been formed.

The second sheet conveying passage 42 branches from the branch portion 43 and extends upward to the second sheet discharge port 7B. The broken line arrow in FIG. 3 indicates the path through which the sheet S that has passed through the fixing portion 6 moves toward the second sheet discharge port 7B. The second sheet conveying passage 42 includes a pair of conveying rollers 421 and a pair of second discharge rollers 422. The path switching portion 44 is disposed in a middle part of the second sheet conveying passage 42, between the pair of conveying rollers 421 and the pair of second discharge rollers 422.

The pair of conveying rollers 421 is disposed in an upstream part of the second sheet conveying passage 42. The pair of conveying rollers 421 conveys the sheet S having passed through the branch portion 43 toward the path switching portion 44. The pair of second discharge rollers 422 is disposed at the downstream end of the second sheet conveying passage 42. The pair of second discharge rollers 422 switches back the sheet S having passed through the path switching portion 44.

More specifically, the pair of second discharge rollers 422 first rotates forward to make the downstream end (leading end), in the conveying direction, of the sheet S held at the nip protrude out through the second sheet discharge port 7B; then stops rotating before the upstream end (trailing end) of the sheet S passes through the nip; and then rotates reversely to switch the conveying direction of the sheet S so that it is conveyed toward the reversing conveying passage 4*r*. The path switching portion 44 has a path switching member (not shown). In this way, the second sheet conveying passage 42 branches from the branch portion 43, and though it the sheet S after image formation is conveyed.

The branch portion 43 is disposed above the fixing portion 6, in a middle part of the first sheet conveying passage 41. At the branch portion 43, the second sheet conveying passage 42 branches from the first sheet conveying passage 41. The branch portion 43 includes the switching guide 45.

The switching guide 45 has a rotation axis 451. The rotation axis 451 extends in the sheet width direction perpendicular to the sheet conveying direction (in the depth direction with respect to the plane of FIGS. 2 and 3). The switching guide 45 is swingable about the rotation axis 451 and, as shown in FIGS. 2 and 3, switches the sheet conveying passage 40R between the first and second sheet conveying passages 41 and 42.

Figure 4:
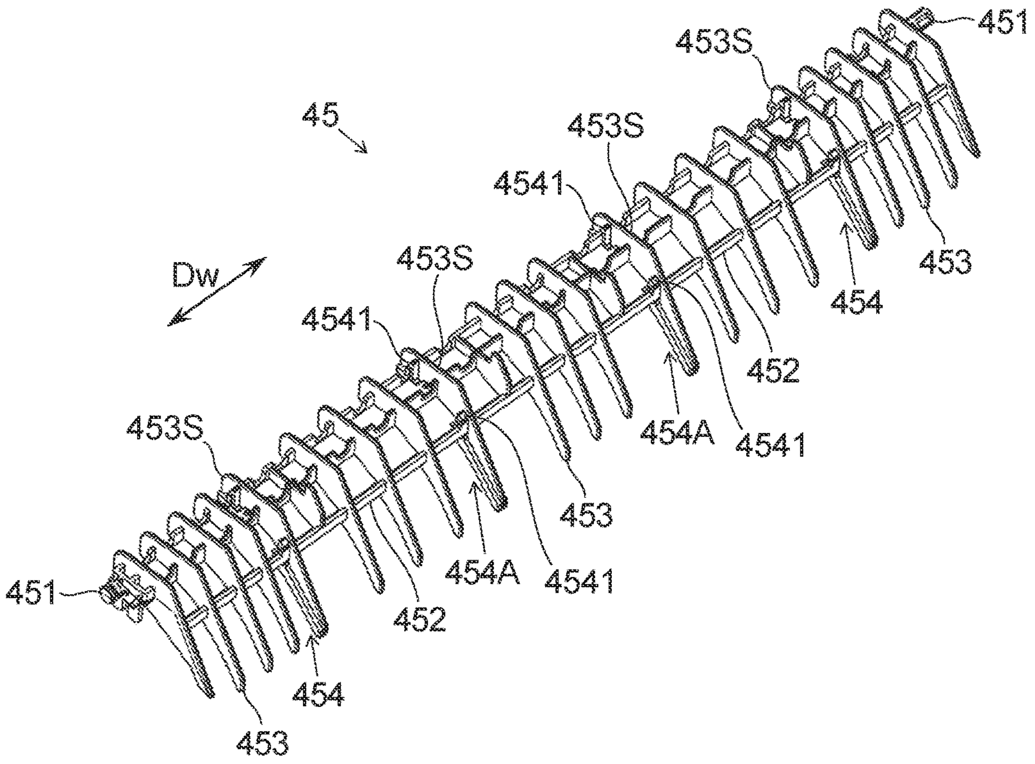
FIG. 4 is a perspective view of the switching guide in FIG. 2 as seen from above.
Figure 5:
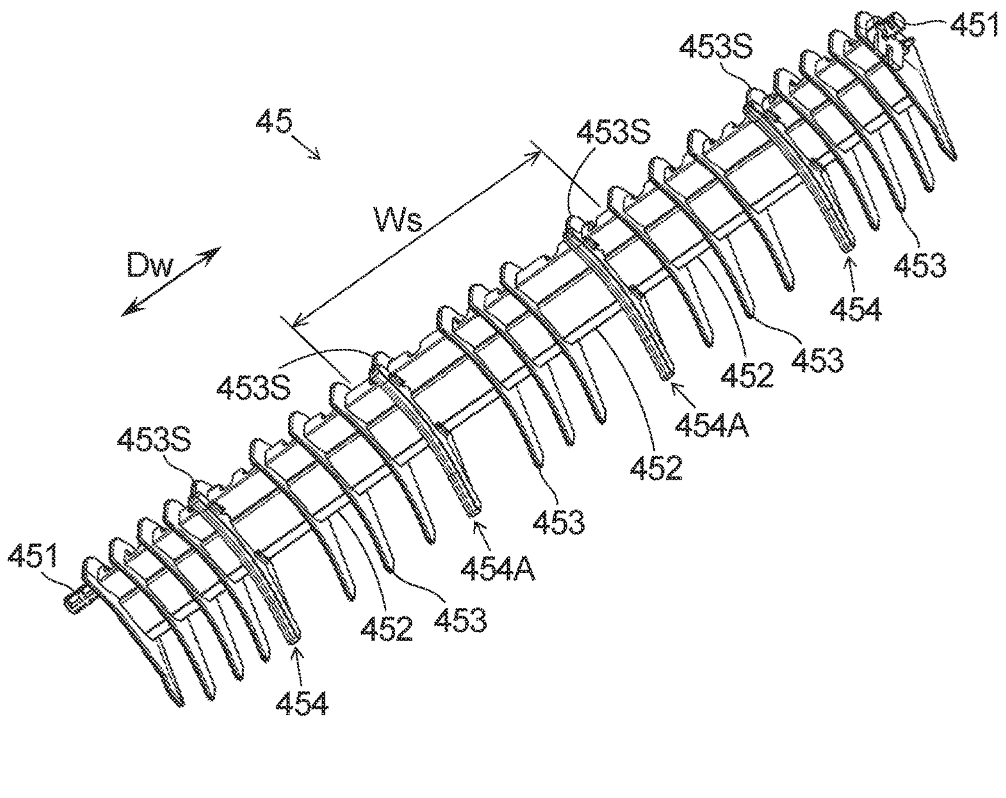
FIG. 5 is a perspective view of the switching guide in FIG. 2 as seen from below.
Figure 6:
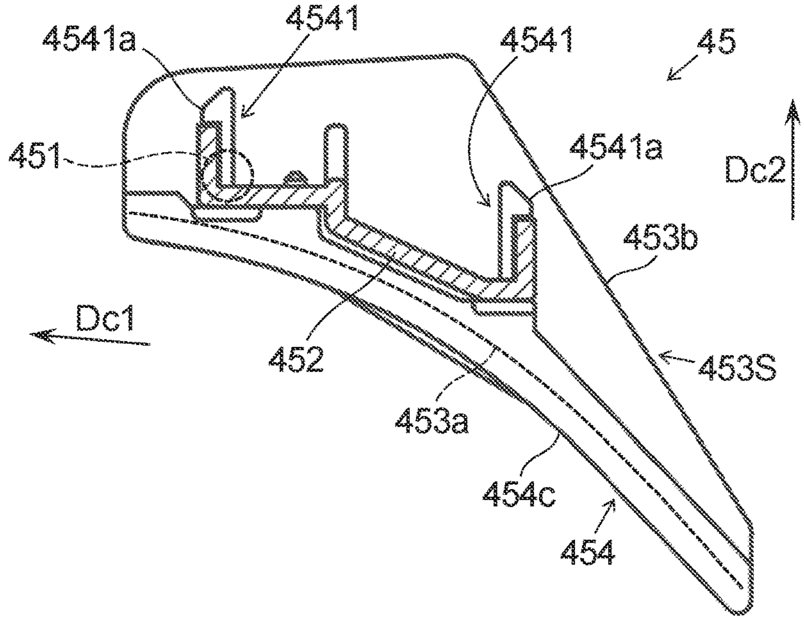
FIG. 6 is a sectional views of a supporting portion in the switching guide in FIG. 4.
Figure 7:
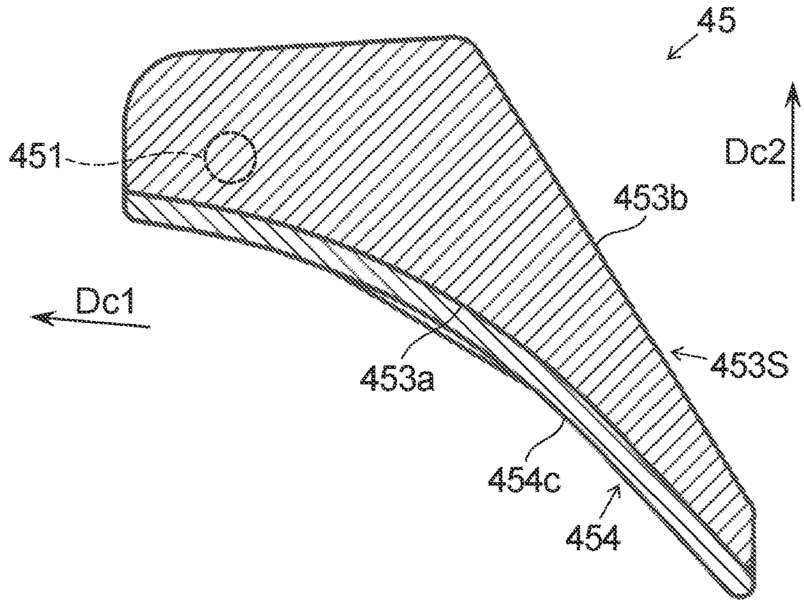
FIG. 7 is a sectional views of a guide rib in the switching guide in FIG. 4.

Next, the structure of the switching guide 45 will be described in detail. FIGS. 4 and 5 are perspective views of the switching guide 45 in FIG. 2 as seen from above and below respectively. FIGS. 6 and 7 are sectional views of a supporting portion 452 and a guide rib 453 in the switching guide 45 in FIG. 4. FIGS. 4 and 5 are marked with the sheet width direction Dw, and FIGS. 6 and 7 are marked with the sheet conveying direction Dc1 for the first sheet conveying passage 41 and the sheet conveying direction Dc2 for the second sheet conveying passage 42. The switching guide 45 includes the supporting portion 452, a plurality of guide ribs 453, and guide members 454.

The supporting portion 452 is disposed so as to lie between every two adjacent ones of the plurality of guide ribs 453 arrayed side by side. The supporting portion 452 extends in the sheet width direction Dw. The supporting portion 452 supports the plurality of guide ribs 453.

The plurality of guide ribs 453 are supported on the supporting portion 452. The plurality of guide ribs 453 are disposed at intervals in the sheet width direction Dw. In the embodiment, the switching guide 45 includes, for example, 21 guide ribs 453.

The plurality of guide ribs 453 each extend along the up-down direction and also along the sheet conveying direction. The rotation axis 451 is disposed in a downstream part of the switching guide 45 in the sheet conveying direction Dc1 along the first sheet conveying passage 41. The guide ribs 453 protrude substantially in an acute-angled shape from the rotation axis 451 side toward the upstream side in the sheet conveying direction Dc1. The guide ribs 453 have first guide surfaces 453*a* and second guide surfaces 453*b*.

The first guide surfaces 453*a* are disposed to face the first sheet conveying passage 41. The first guide surfaces 453*a* guide the sheet S that has been conveyed to the branch portion 43 via the fixing portion 6 to the first sheet conveying passage 41. The second guide surfaces 453*b* are disposed to face the second sheet conveying passage 42. The second guide surfaces 453*b* guide the sheet S that has been conveyed to the branch portion 43 via the fixing portion 6 to the second sheet conveying passage 42.

The guide members 454 are fitted to either or both of the first and second guide surfaces 453*a* and 453*b* of the guide ribs 453. In the embodiment, the guide members 454 are fitted to the first guide surfaces 453*a* of the guide ribs 453. The guide members 454 extend along the sheet conveying direction Dc1 of the first sheet conveying passage 41. The guide members 454 are formed of a material having higher slidability than the guide ribs 453.

The guide members 454 are fitted to specific guide ribs 453S selected from the plurality of guide ribs 453. In the embodiment, the switching guide 45 includes, for example, four previously selected specific guide ribs 453S. The guide members 454 have third guide surfaces 454*c* that are disposed at positions protruding further to an inner side of the first sheet conveying passage 41 (downward in FIGS. 6 and 7) than the first guide surfaces 453*a* of the specific guide ribs 453S.

With this structure, the guide members 454 are fitted at the first sheet conveying passage 41 side of the plurality of guide ribs 453 and, more specifically, are fitted selectively to, of the plurality of guide ribs 453, a predetermined number of specific guide ribs 453S. In this way, it is possible to reduce the weight of the switching guide 45 and thereby achieve high-speed switching operation.

The solid line arrow Ws in FIG. 5 indicates the sheet width of the sheet S of the minimum size that is conveyed through the sheet conveying passage 40R. Of the four guide members 454, the two guide members 454A that are closer to the middle in the sheet width direction Dw are disposed closely inward of the positions at which the edges, in the sheet width direction Dw, of the sheet S of the minimum size conveyed through the sheet conveying passage 40R pass.

In this way, the specific guide ribs 453S with the guide members 454 fitted to them include guide ribs 453 disposed closely inward of the positions at which the edges, in the sheet width direction Dw, of the sheet S of the minimum size conveyed through the sheet conveying passage 40R pass. That is, it is possible to select, according to the size of the sheet S used in the image forming apparatus 1, the specific guide ribs 453S to which the guide members 454 are fitted. It is thus possible to reduce the number of guide members 454 according to the size of the sheet S, and thereby to reduce the weight of the switching guide 45.

The guide members 454 are made of fluororesin. With this design, it is possible to further enhance sliding on the guide members 454.

Figure 8:
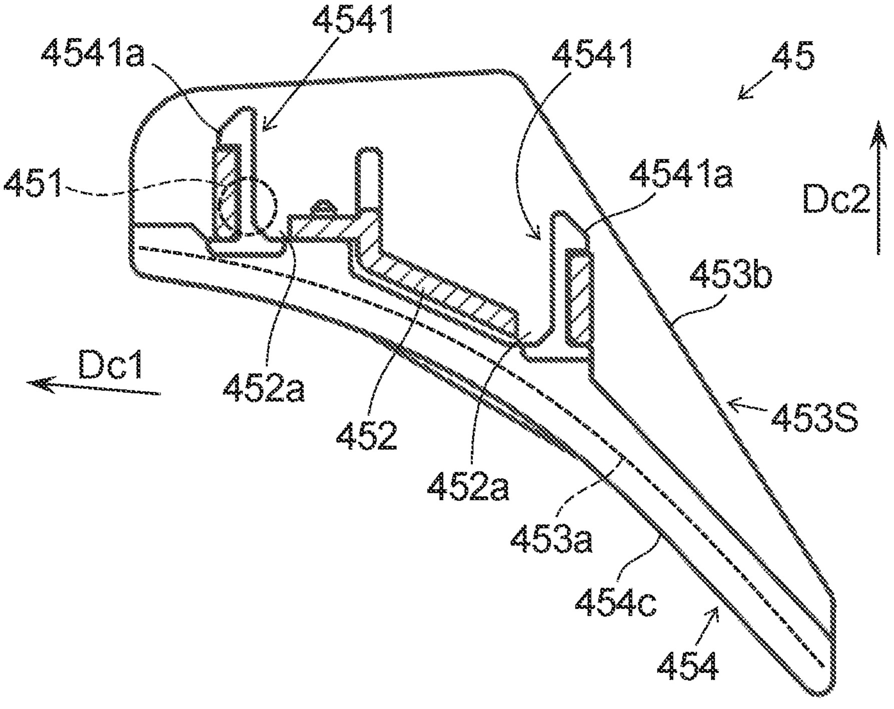
FIG. 8 is a sectional view of attachment pieces of a guide member in the switching guide in FIG. 4.

FIG. 8 is a sectional view of attachment pieces 4541 of the guide members 454 in the switching guide 45 in FIG. 4. The guide members 454 include attachment pieces 4541 as shown in FIG. 8.

The two attachment pieces 4541 are disposed side by side along the sheet conveying direction Dc1 of the first sheet conveying passage 41. The attachment pieces 4541 extend so as to protrude in a direction away from the first sheet conveying passage 41 side of the guide members 454 (upward in FIG. 8) and are located adjacent to the supporting portion 452. The attachment pieces 4541 are elastically deformable and have in tip end parts of them hooks 4541*a* in an aduncate shape.

The supporting portion 452 has holes 452*a* formed in it. Two holes 452*a* are disposed side by side along the sheet conveying direction Dc1 of the first sheet conveying passage 41. In other words, two holes 452*a* are disposed at the same positions as the two attachment pieces 4541 of the guide members 454 in both the sheet conveying direction Dc1 and the sheet width direction Dw. The holes 452*a* penetrate the supporting portion 452 in a direction away from the first sheet conveying passage 41 side (upward in FIG. 8). When the guide members 454 are fitted to the specific guide ribs 453S, the two attachment pieces 4541 are inserted in the two holes 452*a* respectively.

When the guide members 454 are fitted to the specific guide ribs 453S, the attachment pieces 4541 make contact with the supporting portion 452 and deform elastically, and the hook 4541*a* engages with the supporting portion 452; thereby the guide members 454 are fitted to the specific guide ribs 453S. That is, the guide members 454 are fitted to the specific guide ribs 453S via the attachment pieces 4541 with a snap-fit structure. With this structure, it is possible to fit the guide members 454 to the specific guide ribs 453S easily.

How the attachment pieces 4541 and the supporting portions 452 are fitted together is not limited to what has just been described. In other words, the attachment pieces 4541 do not necessarily have to be inserted in holes 452*a*. For example, the two attachment pieces 4541 may be fitted with a snap-fit structure such that they clamp the supporting portions 452 from outward to inward of it, from left and right in FIG. 8.

The first sheet conveying passage 41 has a downstream part of it relative to the branch portion 43 in the sheet conveying direction curved from an upstream part of it. More specifically, as shown in FIG. 2, the upstream part of the first sheet conveying passage 41 relative to the branch portion 43 in the sheet conveying direction extends substantially in a straight line in the up-down direction. The downstream part of the first sheet conveying passage 41 relative to the branch portion 43 in the sheet conveying direction curves from the upstream part and extends toward the first sheet discharge port 7A. That is, the first sheet conveying passage 41 has a curved portion 413 that is curved at the branch portion 43 toward the downstream side.

On the other hand, the second sheet conveying passage 42 has a downstream part of it relative to the branch portion 43 in the sheet conveying direction extending substantially in a straight line along an upstream part of it. More specifically, as shown in FIG. 3, the downstream part of the second sheet conveying passage 42 relative to the branch portion 43 in the sheet conveying direction extends substantially in a straight line in the up-down direction. That is, relative to the branch portion 43, the upstream part of the first sheet conveying passage 41 and the downstream part of the second sheet conveying passage 42 in the sheet conveying direction extend substantially in a straight line in the up-down direction.

The guide members 454 are fitted to the first guide surfaces 453*a* of the specific guide ribs 453S. More specifically, the third guide surfaces 454*c* of the guide members 454 are laid over the first guide surfaces 453*a* of the specific guide ribs 453S, and the guide members 454 are fitted to the specific guide ribs 453S. In other words, the guide members 454 cover the area of the specific guide ribs 453S that face the sheet S passing through the first sheet conveying passage 41 at the downstream side of the branch portion 43 in the sheet conveying direction Dc1. The third guide surfaces 454*c* guide the sheet S that passes through the curved portion 413 of the first sheet conveying passage 41.

That is, the guide members 454 are fitted to the specific guide ribs 453S so as to cover the area of the guide ribs 453 that are expected to make contact with the sheet S conveyed from the fixing portion 6 straight upward and is then conveyed while curving from the branch portion 43 toward the first sheet discharge port 7A. By contrast, for the sheet S which is conveyed from the fixing portion 6 straight upward and is then, after passing through the branch portion 43, conveyed upward toward the second sheet discharge port 7B, no contact of the sheet S with the guide ribs 453 is expected; thus, the guide members 454 are not fitted to the specific guide ribs 453S.

With this structure, the guide members 454 are fitted, of the first sheet conveying passage 41 side and the second sheet conveying passage 42 side of the specific guide ribs 453S, only at the first sheet conveying passage 41 side. Thus, it is possible to reduce the number of guide members 454 according to the shape of the sheet conveying passage 40R and thereby reduce the weight of the switching guide 45.

The description given above of embodiments of the present disclosure is in no way meant to limit the scope of the present disclosure; the present disclosure can be implemented with any modifications made without departing from the spirit of the present disclosure.

For example, while in the embodiment described above, the image forming apparatus 1 is assumed to be a color-printing image forming apparatus of what is called a tandem type in which images of a plurality of colors are formed so as to be sequentially superposed on each other, this is not meant as any limitation to that and similar types. The image forming apparatus may be a color-printing image forming apparatus of any type other than a tandem type, or may be an image forming apparatus for monochrome printing.

What is claimed is:

1. A sheet conveying device comprising:

a sheet conveying passage including
- a first sheet conveying passage through which a sheet on which an image has been formed is conveyed and a second sheet conveying passage which branches from a branch portion in the first sheet conveying passage and through which the sheet is conveyed; and a switching guide which is disposed at the branch portion, which is swingable about a rotation axis that extends in a sheet width direction perpendicular to a sheet conveying direction, and which switches the sheet conveying passage between the first and second sheet conveying passages, wherein the switching guide includes
- a supporting portion that extends in the sheet width direction,
- a plurality of guide ribs which are disposed on the supporting portion at intervals in the sheet width direction and which extend along the sheet conveying direction, and
- guide members which are fitted to specific guide ribs that have been selected from the plurality of guide ribs, the plurality of guide ribs have
- first guide surfaces that guide the sheet to the first sheet conveying passage, and
- second guide surfaces that guide the sheet to the second sheet conveying passage, and the guide members include third guide surfaces formed of a material having higher slidability than the plurality of guide ribs and are disposed at positions protruding further to an inner side of the sheet conveying passage than the first or second guide surfaces.

2. The sheet conveying device according to claim 1, wherein the specific guide ribs are disposed closely inward of positions at which edges, in the sheet width direction, of the sheet of a minimum size conveyed through the sheet conveying passage pass.

3. The sheet conveying device according to claim 1, wherein the guide members are made of fluororesin.

4. The sheet conveying device according to claim 1, wherein the guide members include attachment pieces with snap fit structures which are inserted into holes formed in the supporting portion to engage with the supporting portion, and the guide members are fitted to the specific guide ribs with the attachment pieces.

5. The sheet conveying device according to claim 1, wherein a downstream part of the first sheet conveying passage relative to the branch portion in the sheet conveying direction is curved from an upstream part of the first sheet conveying passage, and the first sheet conveying passage has a curved portion that is curved at the branch portion toward the downstream side, a downstream part of the second sheet conveying passage relative to the branch portion in the sheet conveying direction extends substantially in a straight line along an upstream part of the second sheet conveying passage, the third guide surfaces of the guide members are laid over the first guide surfaces of the specific guide ribs, and the guide members are fitted to the specific guide ribs, and the third guide surfaces guide the sheet that passes through the curved portion.

6. An image forming apparatus comprising the sheet conveying device according to claim 1.

* * * * *